Dec. 12, 1961   F. H. BARGETZI, JR., ET AL   3,012,572
RELIEF VALVE
Filed Jan. 9, 1959
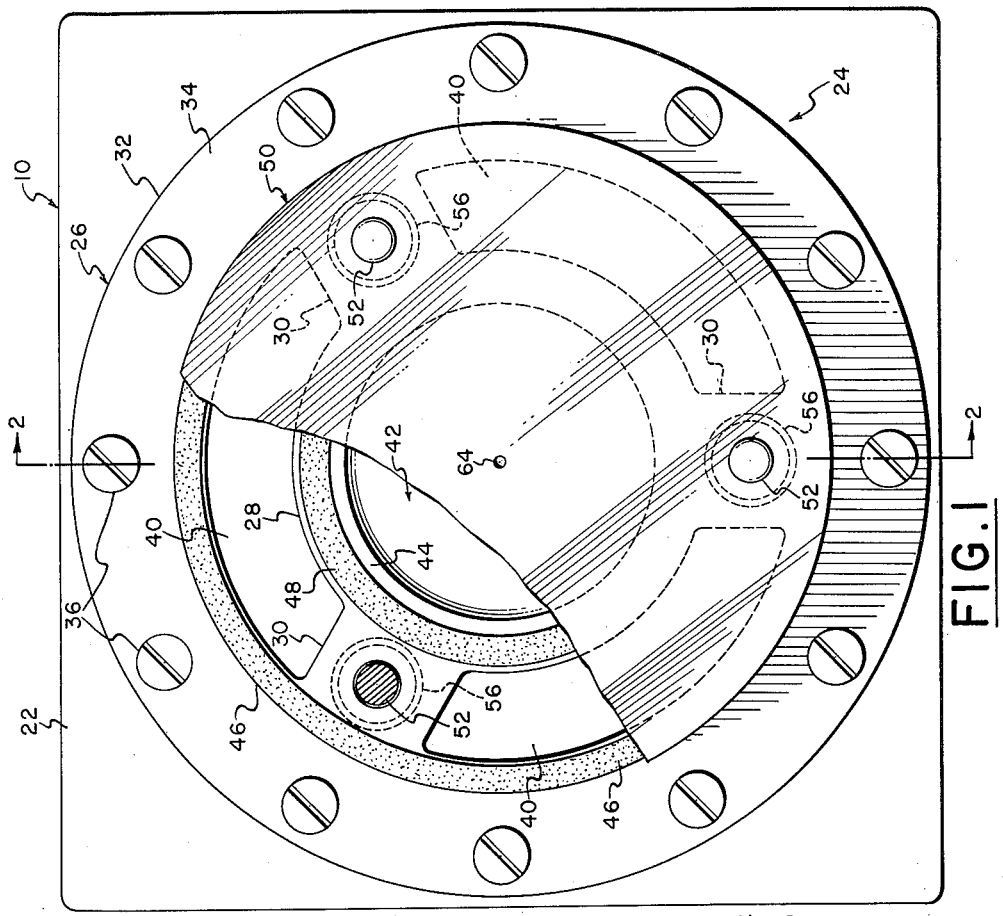
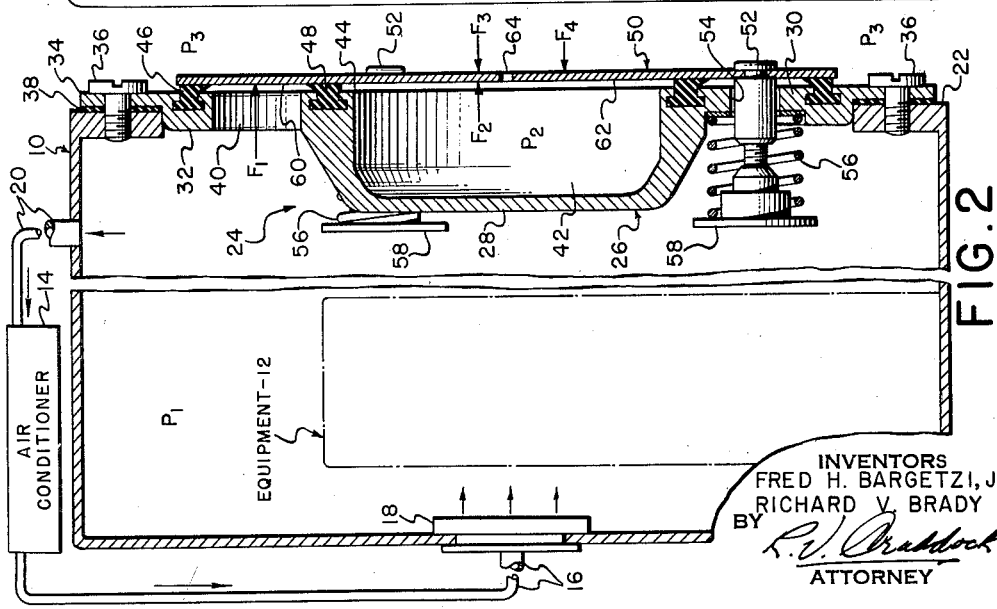
INVENTORS
FRED H. BARGETZI, JR.
RICHARD V. BRADY
BY R. V. Craddock
ATTORNEY

United States Patent Office 3,012,572
Patented Dec. 12, 1961

3,012,572
RELIEF VALVE
Fred H. Bargetzi, Jr., Babylon, and Richard V. Brady, Huntington, N.Y., assignors to Sperry Rand Corporation, a corporation of Delaware
Filed Jan. 9, 1959, Ser. No. 785,855
1 Claim. (Cl. 137—473)

This invention relates to relief valves and more particularly to a safety valve for protecting enclosure walls from rupture due to explosive decompression of the ambient pressure.

A relief valve is one that is interposed between adjacent separate zones to limit the differential pressure to a predetermined value. In the relief function, when predetermined pressure limits are exceeded, fluid flows from the zone on the upstream or inner side of the valve to the adjacent zone on the downstream or outer side of the valve. The adjectives used in the latter sentence are merely convenient terms of reference related to direction of fluid flow when the valve is open in relief.

High altitude aircraft employ pressurized cabins and compartments wherein are located control and other types of equipment in containers or enclosures, the interiors of which are often pressurized by forced cooling. Usually as a result of forced cooling there is a slight pressure differential across the container walls, the ambient pressure being slightly lower than the interior of the container. It is usual to limit the pressure differential by a relief valve in the container wall which is loaded for the pressure that is to be maintained. Since weight is a primary consideration in aircraft equipment, it is desirable to make the equipment container walls no heavier than is necessary to withstand the slight pressure differential due to pressure cooling. While the usual relief valve will respond to relatively slow pressure variations as might occur in a pressurized cabin of an aircraft under normal operation, such a valve would fail to respond quickly enough to explosive decompression of the ambient caused for example by a sudden breach of the cabin wall at high altitude. As a result a higher than normal differential pressure would be developed across the container walls which would likely damage the container and equipment therein if the container walls had been built only to withstand the normal pressure differential thereacross. Thus, it would be desirable to have a relief valve which will maintain the normal pressure differential under normal operating conditions and will also sense and respond rapidly to sudden changes in pressure.

In accordance with the present invention a relief valve having a resiliently biased relief port closure member with opposing valve operating surfaces which provides relief venting under normal rates of change of ambient pressure has in addition, a means for sensing and responding to sudden abnormal changes of ambient pressure, which means includes an "impulse chamber" having an opening that is closed by the closure member in its closed position, the portion of the closure member covering the chamber opening having a breather hole for equalizing the chamber pressure with the ambient pressure under normal rates of change of ambient pressure. The hole size is restricted so that fluid flow therethrough would not be fast enough to restore pressure equilibrium in response to explosive decompression of the ambient. The resulting pressure differential between the chamber and the ambient aids the pressure applied through the normal relief ports against the closure member to force the closure member to the open position with sufficient rapidity to vent the interior of the container before a dangerous pressure differential can build up across its walls.

It is therefore an object of the present invention to provide a relief valve which responds with sufficient rapidity not only to normal pressure variations but also to sudden pressure changes.

Another object of the present invention is to provide a relief valve for the protection of an enclosed zone against sudden decompression in an adjacent zone.

Further objects and advantages of the present invention will be apparent from the following description reference being had to the accompanying drawing wherein a preferred form of the present invention is clearly shown.

In the drawing,

FIG. 1 is a front elevation view of an equipment container having in the front wall thereof a relief valve embodying the features of the invention, and FIG. 2 is a sectional view of the container and valve shown in FIG. 1 taken on the line 2—2 of that figure.

There is shown in the drawing, a rectangular container 10 enclosing, for protective and cooling purposes, equipment generally indicated at 12. Cooling may be provided by forced fluid coolant for example air, pumped from an air cooling unit 14 into the container via a conduit 16 and through a filter 18, and returned to cooling unit 14 through a conduit 20. The container 10 may for exemplary purposes be considered to be located in the pressurized cabin of an aircraft. Mounted in the front wall 22 of the container is a relief valve 24 which includes a circular valve housing 26 having a central portion 28 connected by a plurality of radial legs 30 to a circular skirt 32, a portion of which forms an annular mounting flange 34 which with associated cap screws 36 and a gasket 38 provide a sealed joint between the container wall and the valve housing. The spaces 40 between the legs 30 are relief port openings which extend from the inner side (left side in FIG. 2) of the valve housing to its outer (right) side, and which may be collectively considered as a single relief port. In the central section 28 a chamber 42 has an outwardly facing opening defined by the chamber rim 44.

A pair of resilient valve sealing rings 46 and 48 are anchored in concentric channels formed in the outer face of the valve housing, one in the skirt 32 and the other immediately around the chamber rim 44. The port openings 40 are situated between the concentric rings 46 and 48, which actually form the boundaries of the relief port lying therebetween, and of which the port openings 40 form a part. Rings 46 and 48 lie in the same plane in order that a flat valve plate 50 may, by sealing engagement with the rings, concurrently close both the relief port and the chamber opening. Thus, with respect to the relief port and the chamber opening the valve plate 50 is a common closure member.

The valve plate 50 is floatingly mounted by means of three studs 52 secured to the plate and extending freely through openings 54 provided therefor in the legs 30.

Resilient inward bias for the valve plate 50 is provided by springs 56 encircling the free ends of the studs 52, each spring held in compression between a leg 30 and an adjustable abutment member 58 threadedly engaging the free end of the associated stud 52.

The outer surface of the valve plate 50 and inner surface of the valve plate, the latter surface including the surface 60 between the rings 46 and 48 and the surface 62 bounded by the ring 48, are opposing valve operating surfaces. When the valve plate 50 is in sealing engagement with the rings 46 and 48 in response to inwardly directed force on the plate, the valve plate is in its closed position, and when the plate is forced outwardly to a position where it is disengaged from the rings, it is in the open position. A breather hole 64 is provided in that portion of the valve plate which covers the chamber opening when it is in closed position.

During normal operation and in order to maintain a predetermined pressure differential between the interior and exterior of the container, the springs 56 are loaded to over-ride the outwardly directed fluid pressure against the plate area 60 (area covering the relief port) until the interior pressure reaches a critical point associated with the maximum desirable pressure differential between the container interior and the ambient pressure, at which time a force resulting from the fluid pressure against the area 60 over-rides the spring bias thus moving the valve plate to the open position and opening the relief port to vent the interior of the container.

The breather hole 64 is large enough to permit substantially unrestricted fluid flow through the hole during normal operation to maintain equilibrium between the chamber pressure and the ambient pressure. However, the breather hole is small enough so that in the event of explosive decompression of the ambient due for example to a sudden breach in a wall of the pressurized cabin, fluid flow through the hole is sufficiently restricted to prevent an immediate balance of chamber and ambient pressures, and the pressure against the area 62 due to the pressure differential between the chamber and the ambient aids the force due to pressure against the area 60 to force the valve plate 50 rapidly to an open position, thus opening the relief port to vent the container with sufficient rapidity to prevent the formation of a dangerously high pressure differential across the container walls. Although the forces required to compress the resilient sealing rings 46 and 48 to obtain a tight seal are a practical consideration, they have been ignored or "neutralized" to simplify the explanation of the valve operation. As a practical matter the springs must be additionally loaded to overcome the forces exerted by the sealing rings.

The invention and its operation may be further explained by setting up simple relations involving the disposition and effect of the various forces involved with respect to the valve plate 50. To facilitate this approach the following representations will be employed:

$P_1$ = interior air pressure of container 10.
$A_1$ = area 60 of valve plate 50 exposed to $P_1$.
$F_1 = P_1 \times A_1$.
$P_2$ = air pressure of chamber 42.
$A_2$ = area 62 of valve plate exposed to $P_2$.
$F_2 = P_2 \times A_2$.
$P_3$ = external ambient air pressure.
$A_3$ = area of valve plate exposed to $P_3$.
$F_3 = P_3 \times A_3$.
$F_4$ = force at which valve springs 46 are set.

In the example where the equipment container 10 is located in the pressurized cabin of an aircraft, the ambient pressure $P_3$ within the cabin during normal high altitude operation will vary only slightly. The hole 64 is large enough to allow sufficient air to pass through to equalize the ambient pressure $P_3$ and the chamber pressure $P_2$. Under these "normal" conditions, the valve plate 50 will open only when the following relation is satisfied:

$$F_1 > F_3 + F_4 \text{ or } F_1 - F_3 > F_4$$

During high altitude flight, if the cabin wall is ruptured and the pressure $P_3$ decreased suddenly, the valve operates in the following manner. As the ambient $P_3$ drops rapidly, the chamber pressure $P_2$ attempts to follow but the size of the breather hole 64 is not large enough to allow sufficient air to escape per unit time and therefore $P_2$ remains close to its initial value. The interior pressure $P_1$ of the container is at its initial value, and the forces acting are $F_1$ and $F_2$ to open the valve, and $F_3$ and $F_4$ tending to keep the valve closed, and because $F_2$ aids $F_1$ in attempting to open the valve during the decompression mode, the valve opens as a result of the following relation:

$$F_1 + F_2 - F_3 > F_4$$

The heretofore expressed relations may be compared together as follows:

Normal, $F_1 - F_3 > F_4$ to open valve;
Explosive decompression, $F_1 + F_2 - F_3 > F_4$ to open valve;

and from the above comparison, it is seen that in the explosive decompression mode, $F_1$ can be smaller by $F_2$ than in the normal mode and still open the valve, and the differential pressure between $P_1$ and $P_3$ required to open the valve is less than that required in the normal mode. This being true, the limiting design condition employed to determine the strength of the container is no longer the explosive decompression pressures but the spring forces which can be predetermined and preset according to the interior pressure desired in the particular example, such as the pressures required to obtain proper cooling. This design knowledge is an important advantage in enabling the design of equipment containers of optimum weight.

Another advantage of the chamber 42 is that when the valve plate 50 is open, the area $A_2$ normally exposed to the pressure $P_2$ is also exposed to the pressure $P_1$, thus, creating a greater force on the valve plate tending to throw it out rapidly and holding it open under lower interior pressures.

In a particular practical example, the following dimensions and parameters were employed for the conditions indicated.

To maintain maximum differential pressure at 1.8 p.s.i. under normal conditions including change to about 10.5 p.s.i. cabin pressure within "normal" time after take off, and also under abnormal conditions such as explosive decompression of ambient caused by breach of the cabin wall at approximately 40,000 ft. altitude (most adverse condition) which would result in a decompression rate of approximately 9.25 p.s.i./sec.:

| | | |
|---|---|---|
| Relief port area | sq. in | 6.58 |
| Chamber opening area | sq. in | 5.54 |
| Chamber volume | cu. in | 4.082 |
| Breather hole area | sq. in | .0001431 |
| Force exerted by sealing rings, approx | lbs | 7 |
| Total spring loading, approx | lbs | 19 |

While the form of embodiment of the invention as herein disclosed constitutes a preferred form, it is to be understood that other forms might be adopted, all coming within the scope of the claim which follows.

What is claimed is:

In a pressurized cabin of an aircraft, an equipment-containing pressurized container, a relief valve for regulating the interior pressure of the container with respect to the ambient atmospheric pressure within said cabin, said valve comprising a valve housing in a defining wall of the container, said housing having a relief port therethrough, an inwardly biased movable valve plate having fluid pressure responsive opposing inner and outer valve operating surfaces, said outer surface being exposed to the ambient atmosphere within said cabin, said valve plate being responsive to net inward force thereon to close said port by covering it with said inner surface of the plate, and means for generating a pressure impulse against the inner surface of the valve plate in response to explosive decompression of the ambient atmosphere within the cabin to accelerate the opening of the relief port in case of that event, said means comprising means integral with said valve housing defining a chamber having an outward opening facing said inner surface of the valve plate and disposed to be closed by the plate concurrently with said closure of the relief port, means defining a passage through the valve plate for providing communication between the chamber and the ambient atmosphere adjoining said outer surface of the valve plate, said outer surface of the plate and the outer end of the passage being exposed to the same ambient pressure and changes thereof, the size of said passage being such as to permit by flow therethrough rapid equalization, when the chamber is closed, of the chamber pressure with said ambient pressure in response to relatively slow changes of ambient pressure and to sufficiently retard outward fluid flow from the closed chamber through the passage in response to a sudden drop in said ambient pressure to provide a pressure impulse from the closed chamber and against the valve plate to accelerate the opening thereof.

References Cited in the file of this patent

UNITED STATES PATENTS

| | | |
|---|---|---|
| 318,961 | Crosby | June 2, 1885 |
| 1,356,854 | Clark | Oct. 26, 1920 |
| 1,380,094 | Clark | May 31, 1921 |
| 2,576,637 | Patriquin | Nov. 27, 1951 |

FOREIGN PATENTS

| | | |
|---|---|---|
| 22,218 | Great Britain | of 1902 |
| 888,786 | France | Sept. 13, 1943 |